United States Patent
Ramanthan et al.

(10) Patent No.: US 11,523,215 B2
(45) Date of Patent: Dec. 6, 2022

(54) METHOD AND SYSTEM FOR USING SINGLE ADAPTIVE FILTER FOR ECHO AND POINT NOISE CANCELLATION

(71) Applicant: DSP CONCEPTS, INC., Santa Clara, CA (US)

(72) Inventors: Arvind Ramanthan, Sunnyvale, CA (US); Paul Eric Beckmann, Sunnyvale, CA (US); Shashank Bharathi, San Jose, CA (US)

(73) Assignee: DSP Concepts, Inc., Santa Clara, CA (US)

( * ) Notice: Subject to any disclaimer, the term of this patent is extended or adjusted under 35 U.S.C. 154(b) by 0 days.

(21) Appl. No.: 17/148,297

(22) Filed: Jan. 13, 2021

(65) Prior Publication Data

US 2022/0225024 A1 Jul. 14, 2022

(51) Int. Cl.
*H04R 3/04* (2006.01)
*G10L 15/08* (2006.01)
*G10L 21/0216* (2013.01)
*G10L 25/78* (2013.01)
*H04R 3/00* (2006.01)
*H04R 5/04* (2006.01)

(52) U.S. Cl.
CPC ............ *H04R 3/04* (2013.01); *G10L 15/08* (2013.01); *G10L 21/0216* (2013.01); *G10L 25/78* (2013.01); *H04R 3/005* (2013.01); *H04R 5/04* (2013.01); *G10L 2015/088* (2013.01); *G10L 2021/02166* (2013.01)

(58) Field of Classification Search
None
See application file for complete search history.

(56) References Cited

U.S. PATENT DOCUMENTS

| | | | |
|---|---|---|---|
| 9,653,060 B1 | 5/2017 | Hilmes et al. | |
| 10,304,475 B1 | 5/2019 | Wang et al. | |
| 2009/0022336 A1* | 1/2009 | Visser | G10L 21/0272 381/94.7 |
| 2011/0178798 A1* | 7/2011 | Flaks | G10L 21/0272 704/226 |
| 2014/0003611 A1* | 1/2014 | Mohammad | H04B 3/20 381/66 |

OTHER PUBLICATIONS

"International Application Serial No. PCT/US2022/011983, International Search Report dated Apr. 26, 2022", 4 pgs.
"International Application Serial No. PCT/US2022/011983, Written Opinion dated Apr. 26, 2022", 6 pgs.

* cited by examiner

*Primary Examiner* — Paul W Huber
(74) *Attorney, Agent, or Firm* — Schwegman Lundberg & Woessner, P.A.

(57) ABSTRACT

A method and apparatus for handling both echo cancellation and noise in a given space using a single adaptive filter. The proposed method utilizes just a single adaptive filter and without any control logic, the system is capable of handling both the AEC and the noise in a given space. The technology as proposed and claimed herein proposes using a single adaptive filter to cancel referenced noise AEC and unreferenced noise ANC in a given physical space using a beamformer. By adding the far end reference and a beam pointed dynamically on the noise source in the given physical space this can be achieved. This invention also reduces the processing load and memory.

7 Claims, 5 Drawing Sheets

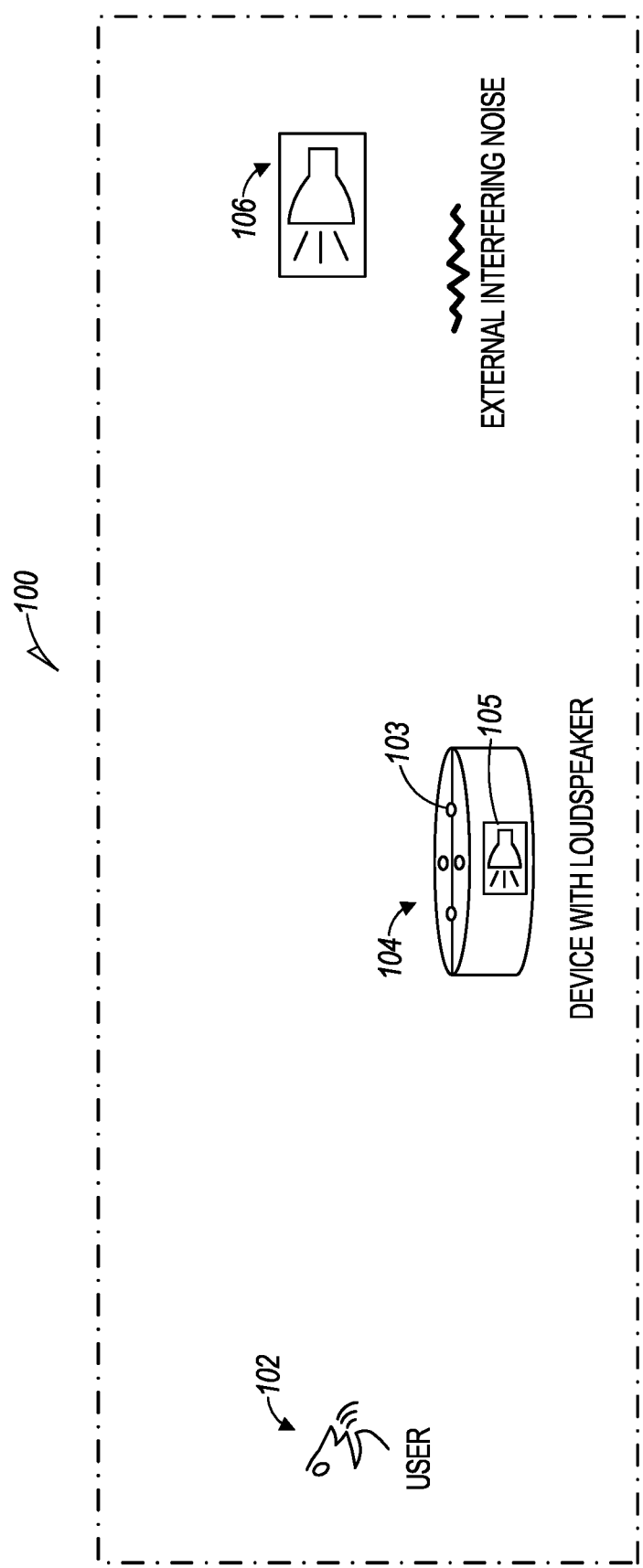

BLOCK DIAGRAM OF AN ADAPTIVE BEAMFORMER

METHOD AND SYSTEM FOR USING SINGLE ADAPTIVE FILTER FOR ECHO AND POINT NOISE CANCELLATION

BACKGROUND

Field

This technology as disclosed herein relates generally to audio signal processing and, more particularly, to echo and noise cancellation.

Background of Art

In small processors the processing capacity and resources are limited and therefore, in order to perform efficient acoustic echo cancellation (AEC) and to suppress any unreferenced noise, a system is needed, which can handle both effectively. In general, the current state of the art is such that in terms of AEC, beamformers are used to perform an effective AEC where the beams are pointed towards the loudspeaker to capture any non-linearities it may have and pass that as a reference to an adaptive filter to obtain a better Echo Return Loss Estimate.

The previous methods handle each problem independently, that is the acoustic echo cancellation and the unreferenced noise cancellation is handled by two different adaptive filters. Where in order to improve the AEC, the non-linearities are passed to the Adaptive filter either through a beamformer directed at a loudspeaker and to handle the unreferenced noise, the noise is tracked by another beam pointing at the angle of the noise source and used as a reference. In the aforementioned method, the shortcoming is that in order to decide out of 2 adaptive filters, which one is supposed to provide the best SNR/better error from the adaptive filter. Also, the existing methods use and exhausts more computation and memory resources as compared to the present technology as disclosed and claimed herein.

In many applications involving speech communication, it is difficult (expensive) to place microphones close to the speakers. The microphone amplification then has to be large due to the large distance to the speech source. As a result, more environmental noise is picked up than in the case where the microphones are close to the speech source. For some of these disturbances, a reference signal may be available. Techniques that rely on the presence of a reference signal can be generally referred to as 'acoustic echo cancellation (AEC) techniques'. For other types of disturbances, no reference signal is available. Techniques that perform disturbance reduction where no reference signal is available can generally be referred to as 'acoustic noise cancellation' (ANC) techniques. In some situations the above two noise reduction techniques are combined causing greater complexity.

Each acoustical environment has an impulse response, which results in a spectral coloration or reverberation of sounds that are recorded in that room. This reverberation is due to reflections of the sound against walls and objects, and hence has specific spatial characteristics, other than those of the original signal. The human auditory system deals with this effectively because it has the ability to concentrate on sounds coming from a certain direction, using information from both ears. If for example one would hear a signal recorded by only one microphone in a reverberant room, speech signals may easily become unintelligible. Of course also voice recognition systems that are trained on non-reverberated speech will have difficulties handling signals that have been filtered by the room impulse response, and hence de-reverberation is necessary.

The most typical application of noise reduction, in case a reference signal is available, is generally referred to as acoustic echo cancellation (AEC), even though the disturbance which is reduced is not always strictly an 'echo'. Sound picked up by the microphones in one room (called the 'far end speech' and the 'far end room') is reproduced by the loudspeakers in the other (near end) room. The task of an 'echo canceller' is to avoid that the portion of the far-end speech signal, which is picked up by the microphones in the near end room, is sent back to the far end. A speaker hearing their own delayed voice is very annoying to the far end speaker.

The loudspeaker signal in both cases is 'filtered' by the room impulse response. This impulse response is the result of the sound being reflected and attenuated (in a frequency dependent way) by the walls and by objects in the room. Due to the nature of this process, the room acoustics can be modeled by a finite impulse response (FIR) filter. Nonlinear effects (mostly by loudspeaker imperfections) are not considered here. In an acoustic echo cancellation algorithm, a model of the room impulse response is identified. Since the conditions in the room may vary continuously (people moving around being an obvious example), the model needs to be updated continuously. This is done by means of adaptive filtering techniques. The input signal to this adaptive filter is the loudspeaker signal (the reference signal), the desired signal for the filter is the microphone signal, and the error signal of the adaptive filter is used as the output signal for the AEC scheme.

The signal picked up by the microphone will in realistic situations often also contain disturbance components for which no reference signal is available. Also for this case, multiple approaches to noise cancellation exist. In multi-channel acoustic noise cancellation, a microphone array is used instead of a single microphone to pick up the signal. Apart from the spectral information also the spatial information can be taken into account. Different techniques that exploit this spatial information exist. In filter- and sum beamforming, a static beam is formed into the (assumed known) direction of the (speech) source of interest (also called the direction of arrival). Since signals coming from other directions than the direction of arrival are attenuated, beamforming also provides a form of de-reverberation of the signal.

In many applications, techniques to cancel noise for which a reference signal exists (AEC) are often combined with techniques that do not use a reference signal (ANC), since both types of disturbances are often present. The order in which both signal processing blocks are applied to the signals can be important, but the simple fact that both signal processing techniques are use with multiple adaptive filters, the cost is more and more processor capacity is needed.

Again, the previous methods handle each problem independently, that is the acoustic echo cancellation and the unreferenced noise cancellation is handled by two different adaptive filters. In the mentioned method the shortcoming is to decide out of 2 adaptive filters, which one is supposed to provide the best SNR/better error from the adaptive filter. Also, the existing methods uses more computation and memory resources compared to this invention. A better method is needed. A better apparatus and/or method is needed for improving AEC and ANC.

SUMMARY

The technology as disclosed herein includes a method and apparatus for handling both echo cancellation and noise in a given space using a single adaptive filter. The proposed method utilizes just a single adaptive filter and without a need for control logic, the system is capable of handling both the AEC and the noise in a given space. The technology as proposed and claimed herein proposes using a single adaptive filter to cancel referenced noise AEC and unreferenced noise ANC in a given physical space using a beamformer. By adding the far end reference and a beam pointed dynamically on the noise source in the given physical space this can be achieved. This invention also reduces the processing load and memory usage.

The advantage of the proposed method is high resource efficiency. In addition, it is dynamic and can handle both the situations dynamically (i.e., where there is a playback reference and/or when there is an unreferenced noise source). As the unreferenced noise reference beam and the provided AEC reference are mixed and passed as a single reference to the adaptive filter there is no need for an additional adaptive filter, which is the reason for the lower resource requirement. The proposed technology as disclosed and claimed herein can also improve the AEC when the speaker transmits non-linear components, and this is captured by the beam which is tracking the unreferenced noise.

To handle these two types of noises in a room, the technology as proposed and claimed herein teaches handling these two noise types with a single adaptive filter. For one implementation, the system includes at least 3 or more microphones and the mic locations are in at least both the X and Y coordinates and is a preferred implementation rather than a linear mic topology, as that will provide optimal beamforming and 360-degree tracking capability. In a preferred implementation a 2-D 4 mic design with three in a circle with a radius of 30 mm and one at the origin (trillium), however, other topologies work. The system also uses a Direction of Arrival (DOA) to detect the angle of unreferenced interfering noise and the direction of the user. Based on the interfering noise angle detected from the DOA, the corresponding beam reference from the adaptive beamformer is selected as a reference, and the DOA keeps track of the source real-time, so, it can dynamically update when the noise is moving in the room. From the above signal flow, the obtained noise beam from the Adaptive beamformer with the help of DOA is mixed with the playback reference and passed as a combined reference to the adaptive filter.

The technology as disclosed and claimed herein can clearly address at least the three following scenarios with a single adaptive filter. 1.) In a case where there is only playback reference and no interfering noise: The provided playback reference will help the adaptive filter to cancel the linear components of the loudspeaker and the adaptive beamformer in this scenario will point at an angle orthogonal to the user and it will capture the non-linear/THD of the loud speaker playback in a beam and mix with the referenced playback to provide the optimal Echo Return Loss Estimate. 2.) In the case of no playback signal and there is a presence of interfering noise: The External noise beam reference is used by the adaptive filter to cancel the noise. 3.) In the case where there is both the interfering noise and playback: The noise which has higher energy is mainly suppressed by the adaptive filter and the lesser dominant noise is ignored or handled by adding a single channel noise reduction technique to the output of the Adaptive filter.

One implementation of the technology as disclosed and claimed utilizes a robust DOA estimate, such that the noise beam is selected with accuracy to avoid selecting the angle where the user is talking to the device. For one implementation of the technology this is further avoided by adding control logic in the selection of the noise beam such as looking for speech characteristics, utilizing a narrow band DOA and with other heuristic approaches such as tracking the duration of the noise source in a specific angle, which one skilled in the art are would clearly understand how to implement. The proposed technology as disclosed and claimed herein is well suited for voice enable devices with a wake word engine looking for a trigger word, as this trigger detection Boolean can be fed as a control signal to the adaptive filter in order to stop updating the filter coefficients just to ensure the user's voice is not attenuated by the filter.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWING

For a better understanding of the present technology as disclosed, reference may be made to the accompanying drawings in which:

FIG. 1 is an illustration of an audio space;

Figure 2A:
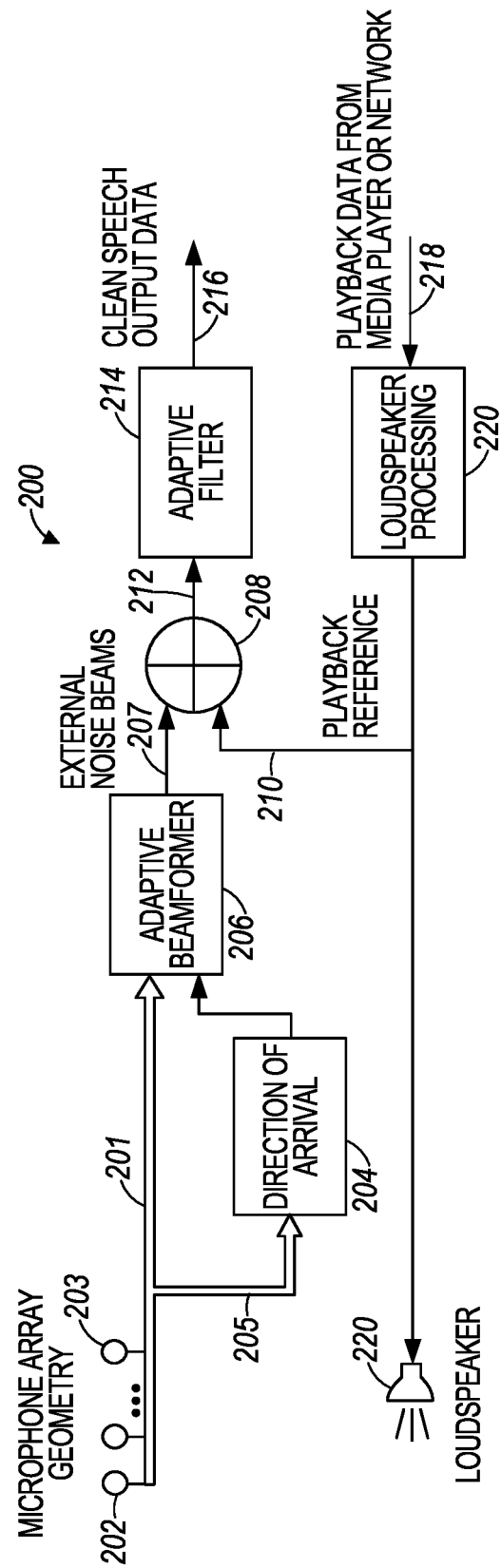
FIG. 2A is an illustration of system for handling both echo cancellation and noise.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

Figure 2B:
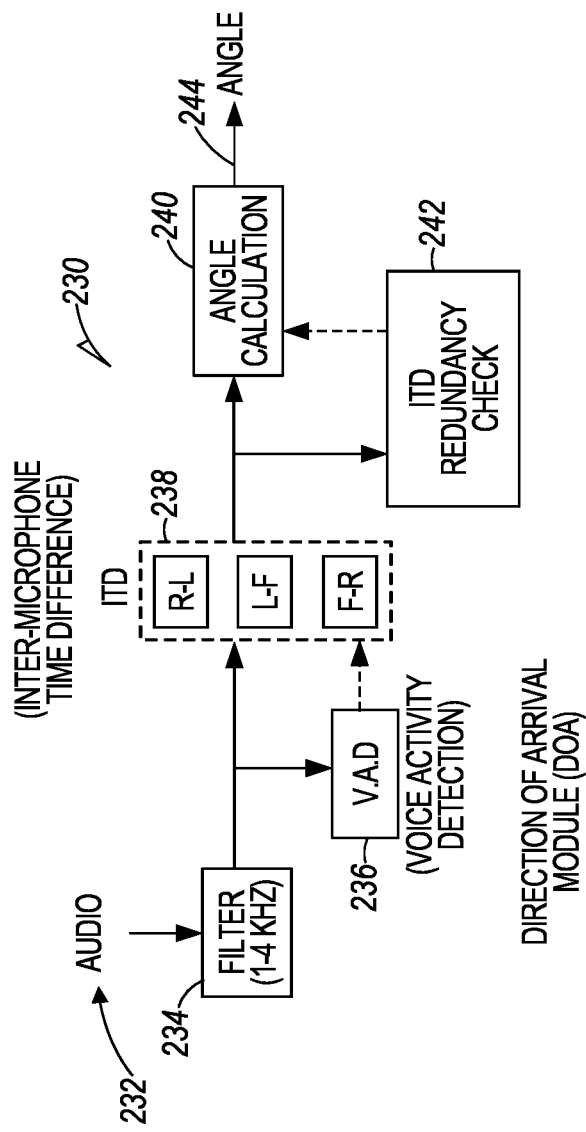
FIG. 2B is an illustration of a DOA apparatus.
Figure 2C:
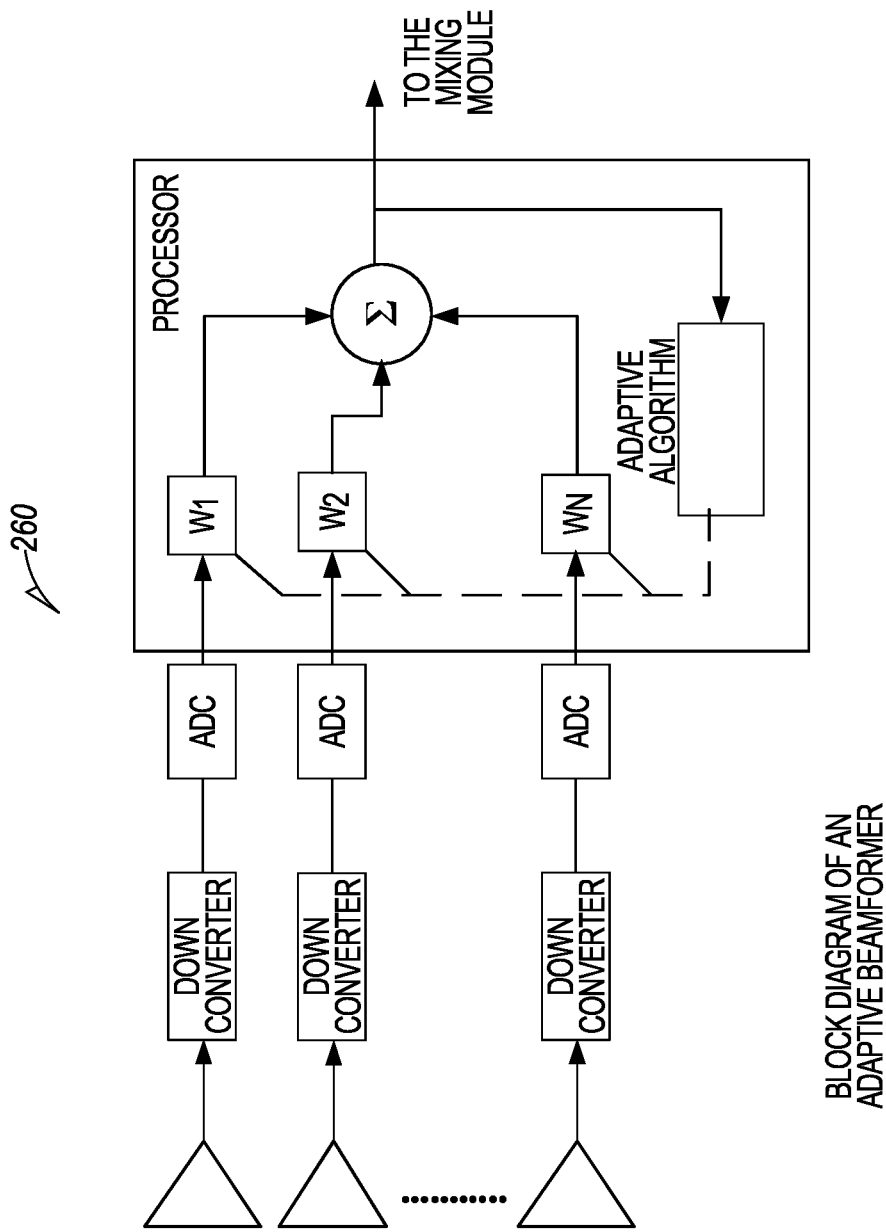
FIG. 2C is an illustration of an adaptive beamformer apparatus.
Figure 2D:
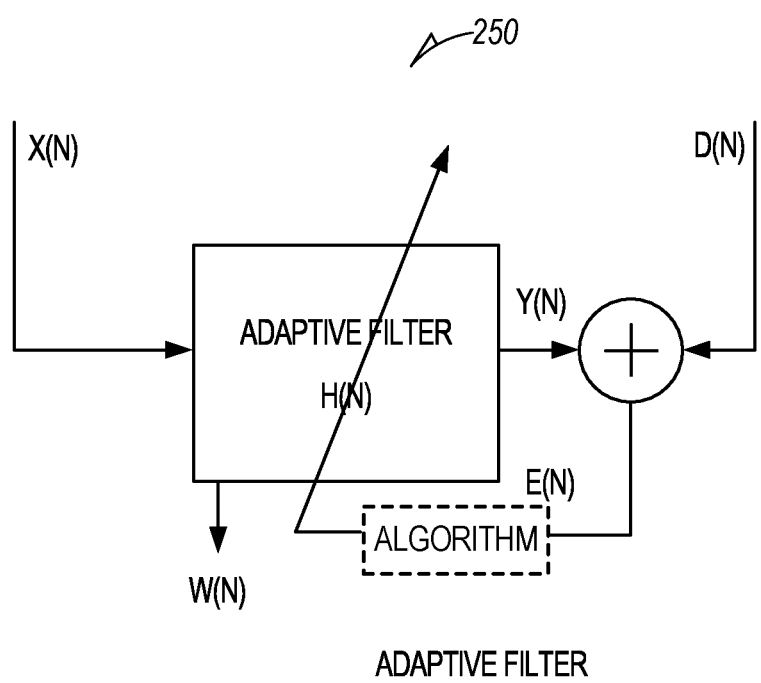
FIG. 2D is an illustration of an adaptive filter apparatus.

According to the implementation(s) of the present technology as disclosed, various views are illustrated in FIGS. 1-2D and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed and claimed herein comprising a single adaptive filter to cancel referenced noise AEC and unreferenced noise ANC in a given physical space using a beamformer teaches a novel apparatus and method for using single adaptive filter for echo and point noise cancellation.

In digital signal processing, an Adaptive Filter constitutes one of the core technologies and finds numerous application areas in science as well as in industry. In wide range of applications, Adaptive filtering techniques are used, including echo cancellation, adaptive equalization, and adaptive noise cancellation. An adaptive filter is a system with a linear filter that has a transfer function controlled by variable parameters and a component to adjust those parameters according to an optimization algorithm or other function. Echo is the reflected copy of the voice heard some time later and delayed version of the original. In telecommunication system Acoustic Echo cancellation are used. When interference of the signal occurred by Acoustic Echo, then it discomposes to the user and thus the quality of communication is reduces. Echo cancellers are very successful and today almost no echo at all can be perceived while using telephones.

An adaptive filter is a computational device that attempts to model the relationship between two signals in real time in an iterative manner. According to an adaptive algorithm, an adaptive filter self-adjusts the filter coefficients. Today's technical environment for communication and audio systems includes the desired signal, referenced and unreferenced additive noise, signal interference and echo. Hence an adaptive filter is an appropriate option to reduce the noise or channel effects.

It is common for many audio systems, including voice activated systems, to require an echo cancellation function and an attenuation function to filter out additive noise. As discussed above, in small processors the resources are limited, however, in order to perform efficient AEC and to suppress the unreferenced noise, a system which can handle both effectively is needed. In general, the current state of the art in terms of echo cancellation beamformers are used to perform an effective AEC where the beams are pointed towards the loudspeaker to capture any non-linearities it may have and pass that as a reference to the adaptive filter to obtain better Echo Return Loss Estimate.

The previous methods handle each problem independently, that is, the acoustic echo cancellation and the unreferenced noise cancellation are handled by two different adaptive filters. Where in order to improve the AEC, the non-linearities are passed to the Adaptive filter either through a beamformer and to handle the unreferenced noise, the noise is tracked by another beam pointing at the angle of the noise source and used as a reference. In the mentioned method the shortcoming is to have to decide out of two adaptive filters, which one is supposed to provide the best SNR/better error from the adaptive filter. Also, the existing methods use more computation and memory resources as compared to technology as disclosed and claimed herein.

The technology as disclosed herein includes a method and apparatus for handling both echo cancellation and noise in a given space using a single adaptive filter. Since the proposed method as disclosed and claimed herein utilizes just a single adaptive filter and without any control logic, the system is capable of handling both the AEC and the noise in a given space. The technology as proposed and claimed herein proposes using a single adaptive filter to cancel referenced noise AEC and unreferenced noise ANC in a given physical space using a beamformer. By adding the far end reference and a beam pointed dynamically on the noise source in the given physical space this can be achieved. This invention also reduces the processing load and memory.

One implementation of the technology as disclosed and claimed herein, is a noise canceling system that includes a microphone array with an adaptive beamformer module communicably coupled to the microphone array to thereby receive audio signals from the microphone array of audible sound received by the microphone array. Another implementation of the technology as disclosed and claimed includes a direction of arrival module communicably coupled to the microphone array to thereby receive the audio signals from the microphone array, and where said direction of arrival module is configured with a direction of arrival algorithm to thereby detect the angle of arrival of unreferenced sound, where the direction of arrival module is communicably coupled to the adaptive beamformer module to thereby communicate the angle of the unreferenced sound to the adaptive beamformer module.

The adaptive beamformer module is configured with a beamforming algorithm to select a beam reference and point the beam reference toward the unreferenced sound based on the angle of arrival of the unreferenced sound and to output an obtained unreferenced noise beam signal from the unreferenced sound. For one implementation, the technology as disclosed and claimed includes an audio signal mixing module communicably coupled to the adaptive beamformer to thereby receive the obtained unreferenced noise beam signal and said audio signal mixing module having a playback reference input to thereby receive a playback reference signal corresponding to the referenced sound and said audio signal mixing module combines the playback reference signal and obtained unreferenced noise beam signal. The audio signal mixing module is communicably coupled to an adaptive filter and thereby transmits a combined signal to the adaptive filter. The adaptive filter has control logic and thereby performs one or more of canceling linear components of the playback reference signal and canceling noise in the combined signal.

For yet another implementation of the technology as disclosed and claimed, the direction of arrival algorithm includes control logic that detects speech characteristics and thereby use the speech characteristic to distinguish between a speaker and the unreferenced sound. For one implementation, the direction of arrival algorithm includes a wake word engine that detects a trigger word and thereby distinguishes between voice and the unreferenced sound.

One implementation of the technology as disclosed and claimed is a method for noise canceling including monitoring audible sounds with a microphone array in a given space and receiving audio signals at an adaptive beamformer module of audible sounds received by the microphone array, and detecting the angle of arrival of the unreferenced sound with a direction of arrival module based on audio signals from the microphone array and communicating the angle of the unreferenced sound to the adaptive beamformer module.

One implementation of the technology as disclosed and claimed includes selecting at the beamformer module a beam reference and pointing the beam reference toward the unreferenced sound based on the angle of arrival of the unreferenced sound and outputting an obtained unreferenced noise beam signal. One implementation of the technology includes receiving at an audio signal mixing module the obtained unreferenced noise beam signal and a playback reference signal corresponding to the referenced sound and said audio and combining the playback reference signal with the unreferenced noise beam signal and transmitting a combined signal to an adaptive filter. For one implementation, the technology includes cancelling with said adaptive filter with control logic one or more of linear components of the playback reference signal and noise in the combined signal.

For one implementation, the direction of arrival algorithm includes control logic that thereby detects speech characteristics and thereby uses the speech characteristic for distinguishing between a speaker and unreferenced sound. For one implementation, the direction of arrival algorithm includes a wake word engine thereby detecting a trigger word and thereby distinguishing between voice and an unreferenced sound. One advantage of the technology as disclosed and claimed is that there is no control logic needed in terms of detecting the presence of referenced noise vs unreferenced noise because the adaptive filter gets the mix of both. The referenced and unreferenced noise should converge. Hence the noise beam from adaptive beamformer provides the reference to adaptive filter to cancel and vice versa.

The details of the technology as disclosed and various implementations can be better understood by referring to the figures of the drawing. Referring to FIG. 1, an illustration of an audio space 100 is provided. The technology as disclosed herein includes a method and apparatus for handling both echo cancellation to cancel echoes resulting from the user's 102 voice and noise 106 in a given space 100 using a single adaptive filter. The proposed method utilizes just a single adaptive filter and without a need for control logic, the system is capable of handling both the AEC and the noise in a given space 100. The technology as proposed and claimed herein proposes using a single adaptive filter to cancel referenced noise AEC from a device 104 having a microphone array 103 and a loud speaker 105 and unreferenced noise ANC 106 in a given physical space 100 using a beamformer. By adding the far end reference and a beam pointed dynamically on the noise source 106 in the given physical space 100 this can be achieved. This invention also reduces the processing load and memory.

One advantage of the proposed system and method is the high resource efficiency. In addition, the disclosed and claimed system is dynamic and can handle both the situations dynamically (i.e., where there is a playback reference 210, SEE FIG. 2A and/or when there is an unreferenced noise source). As the unreferenced noise reference beam and the provided AEC reference are mixed 208, SEE FIG. 2A, and passed as a single reference 212, SEE FIG. 2A, to the adaptive filter 214 there is no need for an additional adaptive filter, which is the reason for the lower resource requirement. The proposed idea can also improve the AEC when the speaker transmits non-linear components, and this is captured by the beam which is tracking the unreferenced noise.

To handle these two types of noises in a room, the technology as proposed and claimed teaches handling these two noises with a single adaptive filter. The system requires at least 3 or more microphones 202, SEE FIG. 2A, and the mic locations are disposed in both the X and Y coordinates as preferred rather than a linear mic topology, as that will provide optimal beamforming and 360-degree tracking capability. In a preferred implementation a 2-D 4 mic design with three in a circle with a radius of 30 mm and one at the origin (trillium), however, other topologies can work. The system also uses a Direction of Arrival module 204 to detect the angle of unreferenced interfering noise and the direction of the user 102. Based on the interfering noise angle detected from the DOA, the corresponding beam reference from the adaptive beamformer 206 is selected as a reference, and the DOA 204 keeps track of the source real-time, so, it can dynamically update when the noise is moving in the space 100. From signal flow, the obtained noise beam from the Adaptive beamformer 206 with the help of DOA 204 is mixed 208 with the playback reference 210 and passed as a combined reference 212 to the adaptive filter 214.

The various implementations and examples shown above illustrate a method and system for a single adaptive filter 250, SEE FIG. 2D, to cancel referenced noise AEC and unreferenced noise ANC in a given physical space using an adaptive beamformer 260 an a DOA 230 that teaches a novel apparatus and method for using single adaptive filter 250 for echo and point noise cancellation. A user of the present method and system may choose any of the above implementations, or an equivalent thereof, depending upon the desired application. In this regard, it is recognized that various forms of the subject technologies' method and system and the various components and modules well known to those skilled in the art area could be utilized without departing from the scope of the present technology and various implementations as disclosed.

Referring to FIGS. 2A through 2D, an illustration of system for handling both echo cancellation and noise and the various components and modules is provided. The technology as disclosed herein includes a method and apparatus for handling both echo cancellation and noise in a given space 100 using a single adaptive filter 214. Since the proposed method as disclosed and claimed herein utilizes just a single adaptive filter 214 and without any control logic, the system is capable of handling both the AEC and the noise in a given space. Referring, to FIG. 2D specifically, the algorithm or control logic as illustrated is not required. The technology as proposed and claimed herein proposes using a single adaptive filter to cancel referenced noise AEC and unreferenced noise ANC in a given physical space 100 using an adaptive beamformer 206. By adding the far end reference and a beam pointed dynamically on the noise source 106 in the given physical space this can be achieved. This invention also reduces the processing load and memory.

One implementation of the technology as disclosed and claimed herein, is a noise canceling system 200 including a microphone array 202 with an adaptive beamformer module 206 communicably coupled 201 to the microphone array 202 to thereby receive audio signals 201 from the microphone array 202 of audible sound received by the microphone array including two or more microphones 203. Another implementation of the technology as disclosed and claimed includes a direction of arrival module 204 communicably coupled 205 to the microphone array 202 to thereby receive the audio signals 205 from the microphone array 202, and where said direction of arrival module 204 is configured with a direction of arrival algorithm 240 to thereby detect and output the angle of arrival 244 of unreferenced sound, where the direction of arrival module is communicably coupled to the adaptive beamformer module to thereby communicate the angle 244 of the unreferenced sound to the adaptive beamformer module, 206, where one illustration of such a module is shown in FIG. 2B. The playback data from a media player or network 218 in one implementation is processed by loudspeaker processing 220 and audibly transmitted through a loudspeaker 220.

The adaptive beamformer module is configured with a beamforming algorithm 240 to select a beam reference and point the beam reference toward the unreferenced sound based on the angle of arrival 244 of the unreferenced sound and to output an obtained unreferenced noise beam signal from the unreferenced sound. One illustration is to utilize a voice activation detector 236 sensor and an inter-microphone time difference (ITD) module 238. For one implementation, an ITD 242 redundancy check is utilized. The DOA module for one implementation includes a frequency band filter 234 for filtering incoming audio 232.

For one implementation, the technology as disclosed and claimed includes an audio signal mixing module 208 communicably coupled 207 to the adaptive beamformer to thereby receive the obtained unreferenced noise beam signal 207 and said audio signal mixing module 208 having a playback reference input 210 to thereby receive a playback reference signal 210 corresponding to the referenced sound and said audio signal mixing module 208 combines the playback reference signal and obtained unreferenced noise beam signal. The audio signal mixing module is communicably coupled 212 to an adaptive filter 214 and thereby transmits a combined signal 212 to the adaptive filter 214. The adaptive filter has control logic and thereby performs one or more of canceling linear components of the playback reference signal 210 and canceling noise in the combined signal and outputs clean speech output data 216.

For yet another implementation of the technology as disclosed and claimed, the direction of arrival algorithm includes control logic 240 that detects speech characteristics and thereby use the speech characteristic to distinguish between a speaker 105 and the unreferenced sound 106. For one implementation, the direction of arrival algorithm includes a wake word engine 236 that detects a trigger word and thereby distinguishes between voice and the unreferenced sound. The playback data from the media player is processed 220 and provides a playback reference signal 210 to the loudspeaker 220 and the mixing module 208.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the and scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations. The adaptive beamformer module, the direction of arrival module, the beamforming algorithm and the audio signal mixing module can be implemented in software or hardware.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine that performs playback system may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various implementations and examples shown above illustrate a method and system for a single adaptive filter for noise and echo cancellation. A user of the present technology as disclosed may choose any of the above implementations, or an equivalent thereof, depending upon the desired application. In this regard, it is recognized that various forms of the subject technology as disclosed and claimed could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A noise canceling system comprising:
   a microphone array;
   an adaptive beamformer module communicably coupled to the microphone array and thereby receives audio signals from the microphone array of audible sound received by the microphone array;
   a direction of arrival module communicably coupled to the microphone array and thereby receives the audio signals from the microphone array, where said direction of arrival module is configured with a direction of arrival algorithm and thereby detects an angle of arrival of unreferenced sound, where the direction of arrival algorithm includes a wake word engine that detects a trigger word and thereby distinguishes between voice and the unreferenced sound, and where the direction of arrival module is communicably coupled to the adaptive beamformer module and thereby communicates the angle of arrival of the unreferenced sound to the adaptive beamformer module;
   said adaptive beamformer module having a beamforming algorithm and thereby selects a beam reference and thereby points a beam toward the unreferenced sound based on the angle of arrival of the unreferenced sound and thereby outputs an obtained unreferenced noise beam signal;
   an audio signal mixing module communicably coupled to the adaptive beamformer module and thereby receives the obtained unreferenced noise beam signal and said audio signal mixing module having a playback reference input and thereby receives a playback reference signal corresponding to referenced sound and thereby combines the playback reference signal and the obtained unreferenced noise beam signal;
   said audio signal mixing module communicably coupled to an adaptive filter and thereby transmits a combined signal; and
   said adaptive filter is configured with control logic to perform one or more of canceling linear components of the playback reference signal and canceling noise in the combined signal.

2. The noise canceling system as recited in claim 1, where the direction of arrival algorithm includes control logic that detects speech characteristics and thereby uses the speech characteristics to distinguish between a speaker and the unreferenced sound.

3. A method for noise canceling comprising:
   monitoring audible sounds with a microphone array in a given space;
   receiving audio signals at an adaptive beamformer module of audible sounds received by the microphone array;
   detecting an angle of arrival of unreferenced sound with a direction of arrival module based on audio signals from the microphone array and communicating the angle of arrival for the unreferenced sound to the adaptive beamformer module, where a direction of arrival algorithm of the direction of arrival module includes control logic thereby detecting speech characteristics and thereby using the speech characteristics for distinguishing between a speaker and the unreferenced sound, where the direction of arrival algorithm of the direction of arrival module includes a wake word engine configured for, and thereby detecting, a trigger word and thereby distinguishing between voice and the unreferenced sound;
   selecting at the adaptive beamformer module a beam reference and pointing the beam reference toward the unreferenced sound based on the angle of arrival of the unreferenced sound and outputting an obtained unreferenced noise beam signal;
   receiving at an audio signal mixing module the obtained unreferenced noise beam signal and a playback reference signal corresponding to referenced sound and thereby combining the obtained unreferenced noise beam signal and the playback reference signal;
   transmitting a combined signal to an adaptive filter; and
   cancelling with said adaptive filter with control logic one or more of linear components of the playback reference signal and noise in the combined signal.

4. A noise canceling system comprising:
   an adaptive beamformer module having a beamforming algorithm and thereby selects a beam reference and thereby points a beam toward an unreferenced sound based on an angle of arrival of the unreferenced sound and thereby outputs an obtained unreferenced noise beam signal;
   a direction of arrival module communicably coupled to a microphone array and thereby receives audio signals from the microphone array, where said direction of arrival module has a direction of arrival algorithm and thereby detects the angle of arrival of the unreferenced sound, where the direction of arrival algorithm includes a wake word engine that detects a trigger word and thereby distinguishes between voice and the unreferenced sound, and where the direction of arrival module is communicably coupled to the adaptive beamformer module and thereby communicates the angle of arrival of the unreferenced sound to the adaptive beamformer module;
   an audio signal mixing module communicably coupled to the adaptive beamformer module and thereby receives the obtained unreferenced noise beam signal and said audio signal mixing module having a playback reference input and thereby receives a playback reference signal corresponding to referenced sound and thereby combines the playback reference signal and the obtained unreferenced noise beam signal;
   said audio signal mixing module communicably coupled to an adaptive filter and thereby transmits a combined signal; and
   said adaptive filter having control logic to perform one or more of canceling linear components of the playback reference signal and canceling noise in the combined signal.

5. The noise canceling system as recited in claim 4, where the direction of arrival algorithm includes control logic that detects speech characteristics and thereby uses the speech characteristics to distinguish between a speaker and the unreferenced sound.

6. A method for noise canceling comprising:
   detecting an angle of arrival of an unreferenced sound with a direction of arrival module based on audio signals from a microphone array and communicating the angle of arrival for the unreferenced sound to an adaptive beamformer module, where a direction of arrival algorithm of the direction of arrival module includes a wake word engine configured for, and thereby detecting, a trigger word and thereby distinguishing between voice and the unreferenced sound;

selecting at the adaptive beamformer module a beam reference and pointing the beam reference toward the unreferenced sound based on an angle of arrival of the unreferenced sound and outputting an obtained unreferenced noise beam signal;

receiving at an audio signal mixing module the obtained unreferenced noise beam signal and a playback reference signal corresponding to a referenced sound and thereby combining the obtained unreferenced noise beam signal and a playback reference signal;

transmitting a combined signal to an adaptive filter; and cancelling with said adaptive filter with control logic, one or more of linear components of the playback reference signal and noise in the combined signal.

7. The method for noise canceling as recited in claim 6, where a direction of arrival algorithm of the direction of arrival module includes control logic thereby detecting speech characteristics and thereby using the speech characteristics for distinguishing between a speaker and the unreferenced sound.

\* \* \* \* \*